United States Patent [19]
Newton

[11] 3,979,110
[45] Sept. 7, 1976

[54] ENERGY ABSORBERS

[75] Inventor: Derek Alan Newton, Bushby, England

[73] Assignee: Dunlop Limited, London, England

[22] Filed: Mar. 26, 1974

[21] Appl. No.: 454,927

[30] Foreign Application Priority Data
Mar. 29, 1973 United Kingdom............... 15164/73

[52] U.S. Cl.................................. 267/140; 293/1; 267/152; 293/87
[51] Int. Cl.².......................................... F16F 7/12
[58] Field of Search ........... 267/139, 140, 141, 152, 267/153, 63; 293/1, 71, 63, 87, 70, 85; 188/1 C, 268; 213/221

[56] References Cited
UNITED STATES PATENTS

| | | |
|---|---|---|
| 3,109,639 | 11/1963 | Nicolaisen .......................... 267/153 |
| 3,179,397 | 4/1965 | Cleereman et al.................. 267/140 |
| 3,455,546 | 7/1969 | Shanok et al....................... 267/141 |
| 3,574,379 | 4/1971 | Jordan ................................ 267/140 |
| 3,721,433 | 3/1973 | Sobel ..................................... 293/1 |

Primary Examiner—James B. Marbert
Attorney, Agent, or Firm—Stevens, Davis, Miller & Mosher

[57] ABSTRACT

An energy absorber which comprises in cross-section at least one limb of rubber-plastic composite material comprising a layer of rubber and a layer of plastics, said layers being united together and each extending substantially in the direction of the length of the limb, and the layer of plastics material being capable of absorbing more energy than the layer of rubber during deformation of the limb by bending or buckling.

37 Claims, 19 Drawing Figures

ENERGY ABSORBERS

This invention relates to energy absorbers and in particular, though not exclusively, to impact energy absorbers for attachment to a vehicle to absorb energy and protect the vehicle in the event of an impact.

One object of the present invention is to provide an improved energy abosorber.

According to one aspect of the present invention an energy abosrber comprises in cross-section at least one limb of rubber-plastics composite material comprising a layer of rubber and a layer of plastics, said layers being united together and each extending substantially in the direction of the length of the limb, and the layer of plastics material being capable of absorbing more energy than the layer of rubber during deformation of the limb by bending or buckling.

The layer of plastics is preferably of a relatively high damping polymer which absorbs substantially more energy than the layer or rubber during deformation, and the layer of rubber is preferably of a relatively low damping polymer capable of storing sufficient energy when deformed to subsequently restore the energy absorber to substantially its original shape and configuration.

Preferably the thickness of the plastics layer is less than half the total thickness of the limb, and in particular may be less than a quarter of the limb thickness. This is particularly important where it is desired that the energy absorber gives substantially the same performance over a wide temperature range. Although temperature changes will affect the modulus of the plastics material, the effect of these changes on the overall limb stiffness is reduced the thinner the plastics layer.

The independence of the performance on temperature of the energy absorber may be further improved by suitable heat treatment of the plastics material. Thus in particular where the plastics layer is formed of low density polyethylene and is moulded or otherwise formed against a pre-formed rubber section it is preferable that the plastics material is cooled slowly in a controlled manner, for a time dependent on the size and thickness of the energy absorber, as compared with being allowed to cool relatively rapidly at ambient temperature.

The layers of rubber and plastics may be united together by any suitable method such as by the use of adhesives or bonding agents, and may, for example, be united by the fusion-bonding methods or friction welding technique.

A rubber plastics composite may comprise at least one layer of a substantially linear crystalline low pressure solution olefin polymer fusion-bonded to at least one layer made of a pre-vulcanized rubber composition containing up to 70 percent by volume of a rubbery olefin polymer, and such a moulded rubber-plastics composite may be produced by injection or transfer moulding a substantially linear crystalline low pressure solution olefin polymer so that it is brought, in a molten state, into contact with a pre-vulcanized rubber layer containing up to 70 percent by volume of a rubbery olefin polymer.

While adequate bonding may be achieved using rubber compositions containing up to 70 percent by volume of a rubbery olefin polymer it is preferred to use rubber compositions containing from 5 to 55 percent of a rubbery olefin polymer.

The rubbery olefin polymer may be saturated or unsaturated; rubbers that may be used include ethylene/propylene copolymer, containing from 20 to 85 mole percent ethylene or ethylene/alpha-olefin/polyene terpolymers, containing from 20 to 85 mole percent ethylene and from 0.1 to 10 mole percent units derived from the polyene.

The main ingredients of the rubber composition in addition to the rubbery olefin polymers are one or more fillers and/or extending oils. These may be selected from any of those normally used in compounding olefin polymers, other additives i.e. vulcanizing ingredients, pigments, etc. may also be included.

The substantially linear crystalline low pressure solution olefin polymers are preferably polymers of ethylene or propylene and include low density polyethylene, high density ethylene homopolymers, polypropylene or copolymers of ethylene or propylene with minor amounts of one or more other olefin monomers, for example butene-1, hexene-1, ethylene, propylene or with minor amounts of dienes monomers, i.e. butadiene.

Alternatively a moulded rubber-plastics composite may comprise at least one layer made of a thermoplastic high pressure polymerized ethylene polymer fusion-bonded to at least one layer made of a pre-vulcanized rubber compound containing up to 55 percent by volume of a rubbery olefin polymer, and such a rubber-plastics composite may be produced by injection or transfer-moulding a thermoplastic high pressure polymerized ethylene polymer so that it is brought, in a molten state, into contact with a pre-vulcanized rubber layer containing up to 70 percent by volume of a rubber olefin polymer or polymer blend.

While adequate bonding may be achieved using rubber compositions containing up to 70 percent by volume of a rubber olefin polymer it is preferred to use rubber composition containing from 5 to 55 percent or, more particularly, 5 to 35 percent by volume of a rubbery olefin polymer or polymer blend.

For optimum adhesion with compounds containing 5—35 percent by volume of rubber it is preferred that the vulcanized bonding surface is smooth and is not buffed prior to moulding. However, if it is preferred to use compounds containing greater than 35 percent rubber the adhesion can, when use is being made, for example, of a low density polyethylene (such as XDG 33 available from I.C.I.), be improved by buffing prior to moulding. Even adhesion to compounds containing greater than 55 percent by volume of rubber can be improved by buffing.

The rubber olefin polymer may be saturated or unsaturated; rubbers that may be used include ethylene/propylene copolymers, containing from 20 to 85 mole percent ethylene; ethylene/alpha-olefin/polymer terpolymers, containing from 20 to 85 percent ethylene and from 0.1 to 10 mole percent units derived from the polyene; or blends containing one or more of these with other rubbers, e.g. styrene-butadiene rubber, polybutadiene, polyisoprene etc. The polymer blend may contain from 20 to 100 percent by weight of olefin polymer.

The main ingredients of the rubber composition in addition to the rubbery olefin polymer are fillers and/or extending oils. These may be selected from any of those normally used in compounding olefin polymers. Other additives, i.e. vulcanizing ingredients, pigments etc. may also be included.

The thermoplastic high pressure polymerized ethylene polymers used preferably have melt indices or minimum flow rates of not less than 0.25. These melt indices or minimum flow rates are determined under test conditions, appropriate to the materials, which are specified in ASTM standard D 1238-65T.

These thermoplastic high pressure polymerized ethylene polymers may be homopolymers, i.e. low density ethylene or crystalline copolymers with vinyl alkanoic esters, e.g. vinyl acetate; alkyl acrylates, e.g. ethyl acrylate, or vinyl halives, e.g. vinyl chloride. These plastic materials may contain any of the additives (i.e. fillers, reinforcing agents, etc.) normally added to such plastics materials.

As a further alternative the rubber-plastics composite may be produced by contacting a vulcanized rubber layer with a plastics layer, causing the contacting surfaces to move with respect to one another so that sufficient heat is generated to melt the surface of the plastics layer, and subsequently allowing the layers to cool in contact with one another.

One such method employs a friction welding technique in which one layer is moved physically, with respect to the other layer. These friction welding techniques may involve fairly large movements of the layers relative to one another such as by relative rotation or oscillation as appropriate depending on the shape of the surfaces being united.

Energy absorbers may be formed by extruding a rubber section, allowing this to cool and cure as appropriate before extruding against the rubber section a layer of plastics, and fusion-bonding the rubber and plastics. The long length product so formed may be cut to length as appropriate to form, for example, individual bumpers or bumper mounts.

The composite material may be formed from layers of any compatible rubber and plastics composition. For example, the compositions may be nitrile rubber and styrene-acrylonitrile or homopolymeric vinyl halide plastics (such as P.V.C. polyvinyl dichloride or polyvinylidene chloride); epichlorohydrin-based rubbers (e.g. epichlorohydrin homopolymer or epichlorohydrin/ethylene oxide copolymer) and ester-based polymers (e.g. homopolymers such as polytetramethylene terephthalate and polyethylene terephthalate) or copolymers, especially block copolymers having elastic and plastics blocks such as Hytrel (commercially available from duPont and particularly suitable, especially when hypochlorite treated, for fusion-bonding to cured rubbers such as styrene butadiene, natural rubber, polypropylene oxide, nitrile, and neoprene), or polyformaldehyde polyolefin rubbers (e.g. ethylene/propylene copolymers or ethylene/alpha-olefin/polyene terpolymers containing from 20 percent to 85 percent by weight ethylene of from 0.1 percent to 10 percent polyene) and polyolefin plastics (e.g. homopolymers such as polyethylene and polypropylene or copolymers of ethylene with vinyl alkanoic esters, alkyl acrylates or vinyl halides); polar rubbers (e.g. polyepichlorohydrin rubbers, acrylate rubbers, sulphochlorinated polyethylene, sulphur-cured polyurethane or carboxylated nitrile rubbers) and polyamides (preferably containing from 3 to 12 methylene groups between the amide groups, e.g. Nylon 4 to 13); rubbers with pendent polar groups (e.g. butadiene-acrylonitrile rubbers, polyepichlorohydrin rubbers or acrylate rubbers) and polycarbonate plastics.

In general, as an alternative to use of aforementioned elastomers and plastics, suitable blends of such materials may be used, and the blends may, for example, include fibers such as reinforcing glass fibers.

The limb of the energy-absorber may comprise one layer only of rubber and one layer only of plastics. Alternatively it may be of a sandwich construction comprising at least two layers of rubber and/or plastics depending on the degree of energy absorption required.

Preferably the energy absorber comprises, when viewed in cross-section, two limbs of rubber-plastics composite material. At least one and preferably each limb may be contoured along its length to provide a preferential region of bending or buckling and the contouring may be at an interface between rubber and plastics layers and/or at an outer surface of the limb.

The limbs may be shaped and disposed so that when subjected to a load applied substantially longitudinally of the two limbs the limbs will first deform in a stable manner and then be caused to buckle or bend and in particular, the limbs may be arranged to deform first in a stable manner substantially only in compression.

The energy absorber may be formed from an annular hollow member of deformable elastomeric material constructed so that when viewed in cross-section it has two deformable limbs of rubber-plastics composite material.

Alternatively, the two limbs may be in the form of leg members separate from one another along at least a greater part of each of their lengths as opposed to being part of a hollow member.

The cross-section in which the limbs or axes in the direction of the length of leg members are located may be a single cross-sectional plane or a cross-section taken in two planes angled relative to each other. Thus, in addition to relating to an energy absorber formed either with a hollow member or having just two individual legs or limbs as in the former case, it will be appreciated from the latter alternative that the present invention relates also to mountings having more than one or two individual limbs, for example, three limbs disposed symmetrically at an angle of 120° to each other when viewed in plan.

The limbs may be shaped and disposed such that when caused to bend or buckle the two limbs will move inwardly towards each other or they may be shaped and disposed so that when caused to bend or buckle they will separate away from one another. Preferably in the case where the energy absorber is formed from a hollow member the limbs as seen in cross-section are shaped and disposed to collapse in a substantially concertina manner corresponding to the manner in which bellows collapse axially.

Where two or more limbs are provided, preferably the limbs have similar deflection characteristics and are symmetrically disposed relative to each other in such a manner that when a load is applied to the energy absorber in a direction substantially longitudinally of the limbs the forces created by each limb in a plane perpendicular to said direction are balanced.

The limbs may be formed integral with each other at one or both of their ends or they may be spaced from each other at one or both of their ends. Where the limbs are spaced they may be maintained in spaced relationship by a linking portion of material which, for example, can itself be formed integral with an end of each limb. The linking portion may be in the form of a cross-member which maintains at least one end of each limb in a predetermined spaced relationship from one end of the other limb.

The cross-member may be rigid, may be formed of resilient elastomeric material, and may be formed from the plastics material of the rubber-plastics limbs.

One or both ends of the limbs may be bonded to a support member or may be provided with securing means to permit attachment to a support member.

The limbs may be formed substantially integral with each other at one of their ends and the other ends of the limbs may be arranged spaced from each other in such a manner that the energy absorber is substantially V-shaped or V-shaped when viewed in cross-section. The said other ends of the limbs may be secured in spaced relationship by means of a substantially rigid cross-member. The substantially rigid cross-member may be formed from the plastics material of the rubber-plastics limb and may be integral with or otherwise secured to the limbs. Alternatively the ends of the limbs may be bonded to a rigid cross-member, or formed integrally with securing means for attachment to a rigid cross-member.

The rigid cross-member may be formed from a strip of sheet metal material shaped along its length to provide inclined surfaces and the spaced ends of the limbs may be adapted to engage said inclined surfaces. In the case of an energy absorber having just two limbs the sheet metal strip may be formed with a pair of symmetrically disposed inclined surfaces.

By contrast with an energy absorber formed with two or more independent limbs or legs and optionally having contours on the opposing faces of the limbs, in the case of an energy absorber having a single annular hollow member, preferential regions of bending or buckling may be formed by contouring those internal surfaces of the member which form parts of the hollow member constituting the limbs.

In energy absorbers formed with an annular hollow member it is preferable that a cross-member which may be of rigid plastics material or of resilient elastomeric material extends over each end of the hollow member so as to form a closed internal chamber within the energy absorber or else the limbs as seen in cross-section may be joined together integrally at their ends. The internal chamber may be sealed permanently and filled with a damping fluid, or an orifice may be provided in the hollow member or one of the cross-members to permit a flow of damping fluid to and/or from the internal chamber. The energy absorber may however be of a substantially tubular form having open ends.

An annular hollow member may be of a substantially corrugated shape formed in effect from two or more rubber-plastics portions of frusto-conical shape arranged end-to-end, deformation then occurring in a concertina manner.

The limbs preferably are contoured such that as the energy absorber is subjected to load in a direction longitudinally of the two limbs, each limb will first undergo axial compression until a point of instability is reached when further application of a substantially constant load will cause the limb to buckle and deflect further by bending. Preferably the limbs are contoured either at at least one of their surfaces or at an interface such that up to the point of instability at least the forces due to axial compression are substantially greater than shear forces in the limbs.

Energy absorbers in accordance with the present invention may be arranged in series and/or in parallel and may be arranged in contact or spaced from each other.

An energy absorber in accordance with the present invention may be used as a mounting for a conventional vehicle bumper or it may be formed in the shape of a vehicle bumper and mounted directly to a vehicle body or secured in spaced relationship relative thereto by resilient or rigid mountings. Where the energy absorber is in the form of a bumper it may be of a hollow cross-section and any cavity or channel formed within the bumper or between the bumper and vehicle body may be sealed and filled with a damping fluid, or an orifice may be provided to permit the flow of a fluid to and/or from the chamber substantially in the manner described above in respect of annular hollow member energy absorbers.

Energy absorbers in accordance with the invention are suitable also for other uses such as, for example dock fenders.

Various embodiments of the invention will now be described, by way of example, with reference to the accompanying diagrammatic drawings in which.

Figure 1:
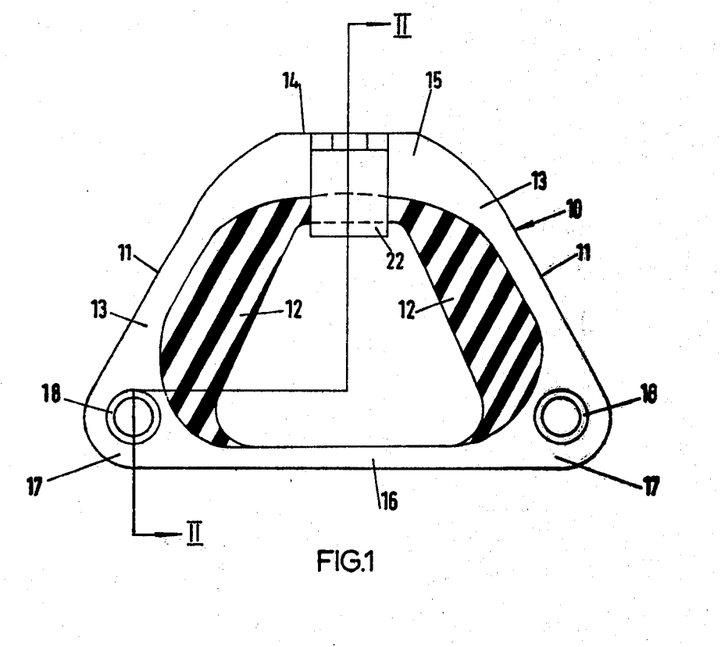
FIG. 1 shows in cross-section an end view of a mounting in accordance with the present invention.
Figure 2:
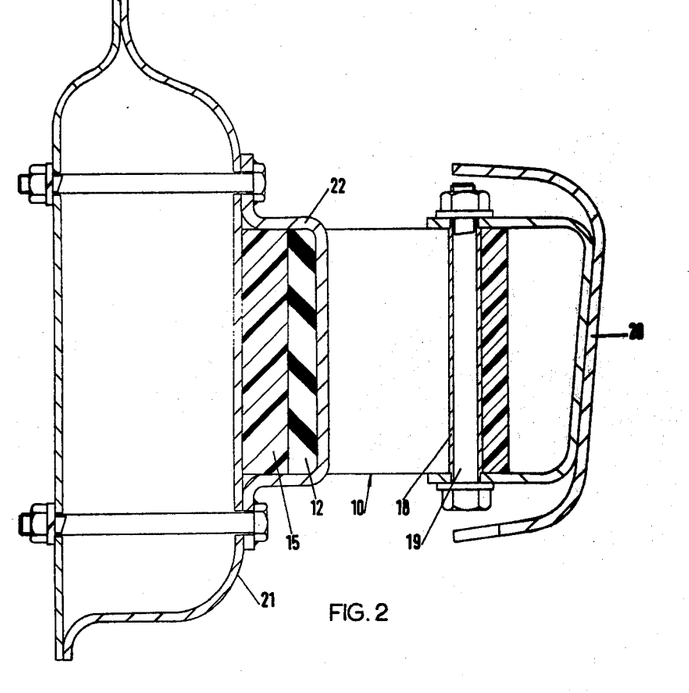
FIG. 2 shows a sectional view of the mounting of FIG. 1 on the line II—II used to secure a bumper to a vehicle body.

In a first embodiment of the invention, illustrated in FIGS. 1 and 2, an energy absorber is in the form of a resilient mounting by which a bumper may be secured to a vehicle body.

The mounting 10 comprises a pair of deformable limbs in the form of leg members 11 each comprising a rubber-plastics composite material comprising a layer of relatively low damping rubber 12 and a layer of relatively high damping plastics 13, the layer of plastics and rubber being united together, as later described, and each extending in the longitudinal direction of the respective leg member. The rubber and plastics materials are ethylenepropylene diene monomer and low density polyethylene respectively, though other materials such as those referred to earlier may be used. The low density polyethylene is the XDG 33 type (available from I.C.I.) and during manufacture of the absorber is allowed to cool slowly as previously described to improve the performance of the absorber over a wide temperature range compared with the performance if the polyethylene were cooled relatively rapidly.

In the construction as illustrated in FIG. 1 the rubber layer represents approximately three-quarters of the limb thickness so as to ensure that the limb can restore sufficient energy when impacted as to be able subsequently to recover its original shape and configuration, and is less temperature dependent in performance than if a thicker layer of plastics were used.

The two leg members 11 are integrally with one another at one of their ends, thus forming an apex region 14, and are maintained in spaced relationship at their other ends so that the mounting is substantially V-shaped.

The rubber layers 12 of the two leg members face each other and are integral with each other at the apex region.

The plastics layers 13 of the leg members face outwards and are linked together at their ends by integral cross-member portions of the plastics material. One plastics cross-member portion 15 at the apex region 14 of the mounting is of increased thickness compared to the thickness of plastics in the leg members.

A second plastics cross-member portion 16 maintains the leg members spaced at their ends remote from the apex region, and in corner portions 17 of the plastics material wherein the plastics layers 13 of the leg members meet the ends of the cross-member portion 16, metal tubes 18 (see FIG. 2) are located one in each corner portion, with their longitudinal axes extending in a direction perpendicular to a plane containing the two leg members of the mounting. Bolts 19 (see FIG. 2) extend through the tubes 18 and permit attachment of the bumper 20 to the energy absorber, and the energy absorber is attached to a vehicle body 21 by means of a metal strap 22.

The rubber and plastics layers of the deformable leg members, in addition to the rubber-plastics interface at the apex regions, are fusion-bonded.

When subjected to compression in the event of an impact the elastomeric leg members will absorb energy initially substantially only in compression, and subsequently by bending and buckling, a substantial proportion of the energy being absorbed by the layer of plastics material. If the impact energy is of such a magnitude that it is not all then absorbed the composite leg members will undergo further direct compression and thus continue to provide a cushioning effect.

Following an impact the energy stored in the rubber layer of each leg member will tend to urge the mounting to return to its initial shape and the energy of any subsequent impacts will be absorbed by re-deformation of the rubber-plastics leg members.

Figure 3:
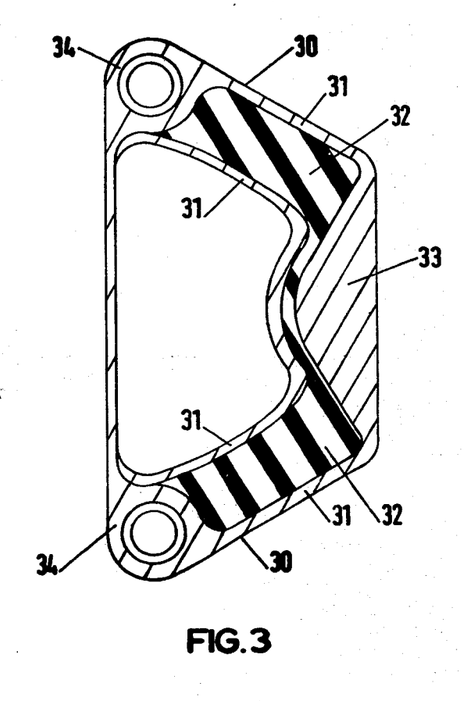
FIG. 3 shows in cross-section an end view of a modified form of the mounting of FIG. 1.

In a second embodiment of the invention, illustrated in FIG. 3, an energy-absorbing mounting is constructed substantially as described in respect of the first embodiment of the invention except that the leg members 30 are each of a sandwich construction comprising two layers 31 of plastics with a layer of rubber 32 therebetween. Each additional layer 31 of plastics is bonded to one of the internal or facing surfaces of the rubber layers of the leg members, and the two additional layers are joined together at the apex region 33 of the mounting. The free ends of the additional layers, being the ends remote from the apex region, are united by fusion-bonding with the plastics material at the corner portions 34 of the mounting.

Figure 4:
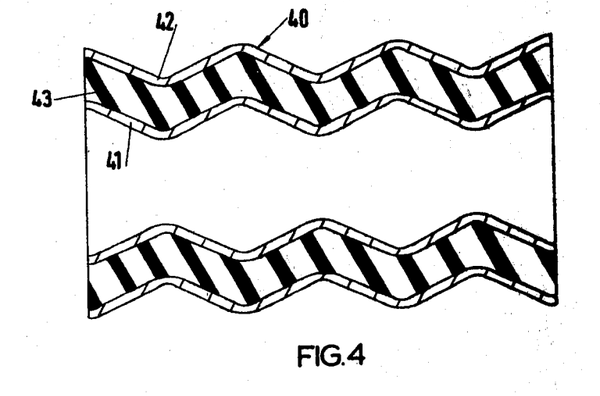
FIG. 4 shows a sectional end elevation of a further mounting in accordance with the present invention.

In a third embodiment of the invention illustrated in FIG. 4, an energy-absorbing mounting is constructed substantially in the form of a corrugated tube 40 which may be considered as formed from a plurality of hollow frusto-conical sections joined end-to-end. The wall of the tube is of a sandwich construction comprising radially inner and outer surface layers 41,42 of plastics material and an intermediate layer 43 of rubber located between and fusion-bonded to the inner and outer surface layers. This energy absorber will have a generally higher stiffness than the two previously described constructions when equivalent quantities of rubber and plastics materials are used, and will deform under axial impact by concertinering substantially in the manner that bellows collapse.

Figure 5:
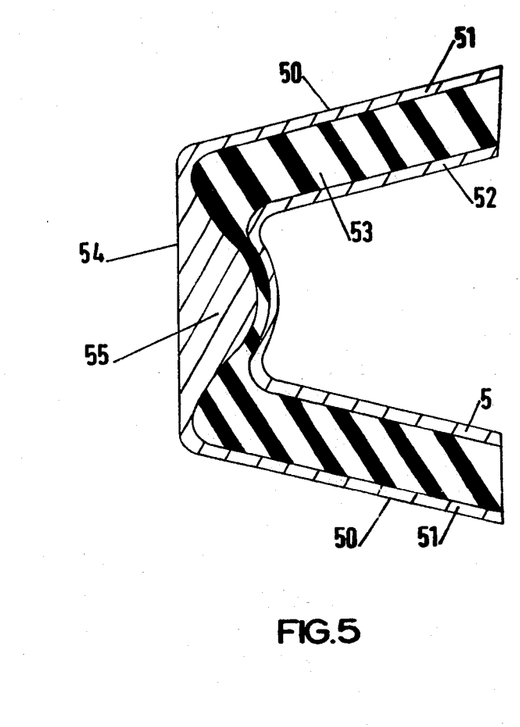
FIG. 5 shows a sectional end elevation of an energy-absorber bumper in accordance with the present invention.

In a fourth embodiment of the invention, illustrated in FIG. 5, an energy-absorbing bumper comprises in cross-section two limbs 50 each comprising two layers 51,52 of plastics material and an intermediate layer 53 of rubber, the limbs in effect being in the form of strips of a length equal to the desired length of the bumper. The two limbs are linked together at one of their ends by a cross-member portion 54, integral with and of similar sandwich construction to the limbs and the limbs 50 are angled relative to each other such that the layer is of a substantially V-shaped cross-section with the cross-member portion constituting an apex region. The outer layer of plastics material is progressively thickened across the cross-member, being thickest at the center region 55 of the cross-member midway between the limbs, and therefore any load applied to said cross-member is transmitted substantially directly to and absorbed at least in part by each of said limbs.

Thus, in contrast to the construction shown in FIGS. 1 to 3, where preferably the apex region is secured to a vehicle body while a rigid bumper is supported by the spaced-apart ends so as in general to reduce bending moments on the bumper in the event of an impact, in the present embodiment, relating to a bumper, the apex region of the cross-section of the bumper constitutes that part of the bumper which will in general be subjected to impact and the spaced-apart ends are affixed to the vehicle body.

The bumper mounts described in respect of the first two embodiments of the invention with reference to FIGS. 1 and 3 may alternatively be constructed with the leg members extending in strip form in a directon perpendicular to the cross-sectional plane shown in the Figures so as to provide modified forms of the bumper shown in FIG. 5, and may likewise be mounted in the manner described in the preceding paragraph.

Figure 6:
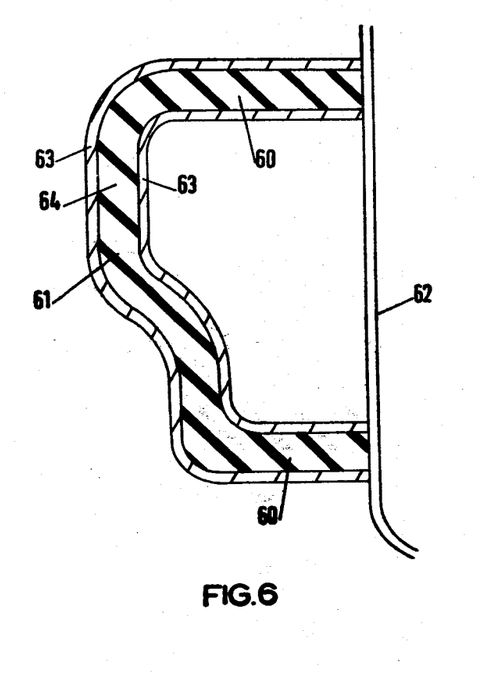
FIG. 6 shows a sectional end elevation of another bumper in accordance with the present invention.

An alternative form of bumper as shown in FIG. 6 comprises, in cross-section, two substantially prallel limbs 60 spaced by a profiled cross-member 61 integral with the limbs at one of each of their ends, the bumper being of a generally rectangular-section channelled form, the open side of which is spanned by a vehicle body 62.

The limbs and cross-members are each of a sandwich construction comprising two layers 63 of plastics and an intermediate layer 64 of rubber, and in this construction both the limb and the cross-member are arranged to bend when impacted and thereby absorb energy.

Figure 7:
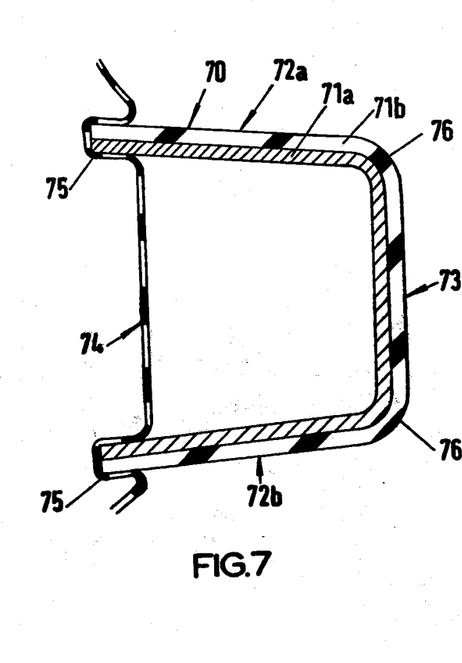
FIG. 7 shows a sectional end elevation of another bumper in accordance with the present invention.

In a sixth embodiment of the invention, illustrated in FIG. 7, a bumper 70 for a vehicle comprises rubber-plastic composite material comprising a laminate of rubber material 71a and plastics material 71b formed in the shape of a channel having sloping sides 72a, 72b which form limb portions with the plastics material 71b forming an outer layer of the channel.

Figure 8A:
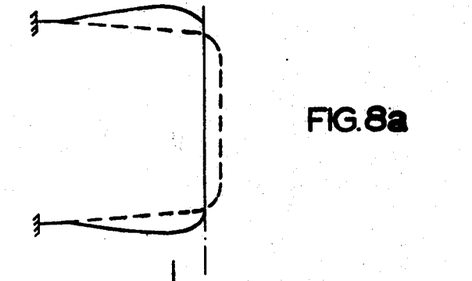
FIGS. 8a, b and c show diagrammatically the mode of deflection of the bumper shown in FIG. 7.
Figure 8B:
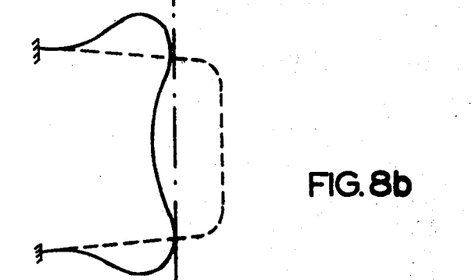
Figure 8C:
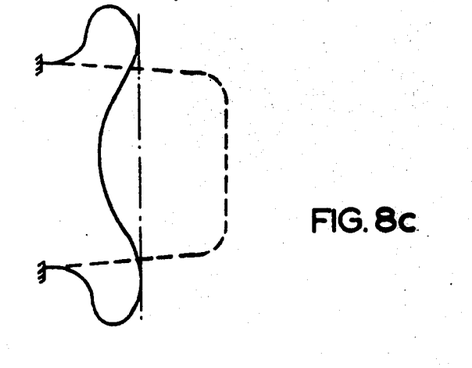

Upper and lower limb portions 72a, and 72b are each connected at one end by a cross-member 73 formed integrally with the limb portions. The bumper is mounted in position on a vehicle body 74 by means of channels 75 formed in the vehicle body to retain, by clamping, the free ends of the limbs 72a, 72b and maintain them in the required spaced relation. The bumper is therefore effectively rigidly secured to the vehicle body in that the ends of the limb portions are not free to rotate relative to the vehicle body and the mode of deflection of this bumper when impacted on the cross-member portion 73 will generally be as shown diagrammatically in FIGS. 8a, 8b, 8c. Initial deflection of the bumper is by buckling of the limb portions 72a, 72b, a high load thus being achieved at a small deflection. Progressive deflection occurs by further buckling of the limb portions and inward bending of the cross-member 73 as shown in FIGS. 8b, and the moulded curved portion 76 of the bumper between the cross-member and limb portions may tend to be straightened by the impact forces and subsequently the mount will bottom as shown in FIG. 8c. These deflections occur under substantially constant loads as indicated by the portion a,b of the static and dynamic characteristic curves in FIGS. 9 and 10.

Figure 9:
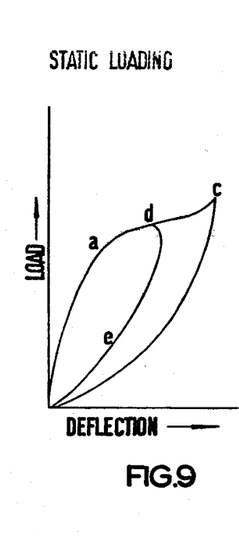
FIG. 9 is a static load-deflection curve for the bumper shown in FIG. 7.
Figure 10:
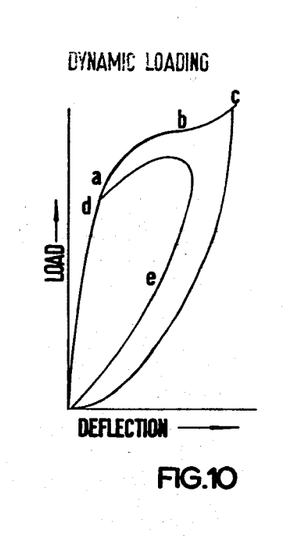
FIG. 10 is a dynamic load-deflection curve for the bumper shown in FIG. 7 when impacted at a velocity of 5 mph.

Further deflection causes the limb portions 72a, 72b to bottom or contact the cross-member portion 73 and vehicle body 74 and the stiffness of the bumper then increases sharply as indicated by the portion b,c of the curves of FIGS. 9 and 10. Under lower load conditions bottoming will not occur and the characteristics will follow the curve 'd e'.

Following impact and deformation, energy stored in the rubber-plastics material of the bumper will cause the bumper to recover its original shape.

The load-deflection characteristics of the unit are dependent on buckling of the side limbs 72a, 72b and to obtain a rapid rise in load with initial deflection it is desirable that the sides should be substantially straight when considered in cross-section.

Figure 11:
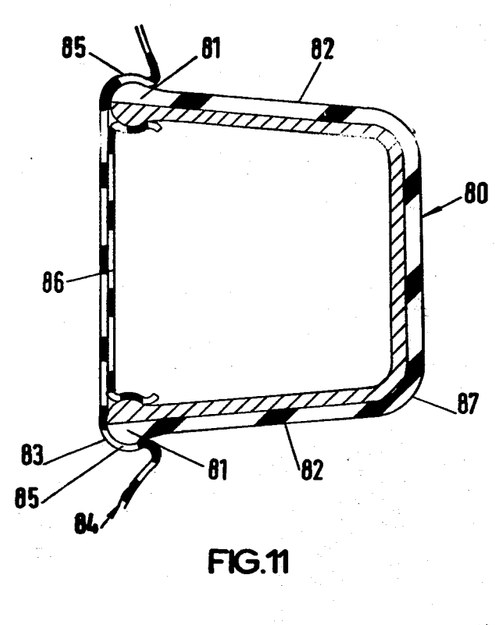
FIG. 11 shows a sectional end elevation of a further bumper in accordance with the present invention.

In a seventh embodiment of the invention, illustrated in FIG. 11, a bumper 80 is constructed substantially as described in respect of FIG. 7 except that in cross-section the ends 81 of the limb portion 82 are enlarged to a substantially circular cross-sectional shape.

The bumper is secured in a recessed portion 83 of a vehicle frame 84 by means of said enlarged ends 81 which are retained against upper and lower edges 85 of the recessed portion 83 by means of a clamp plate 86 secured to the vehicle frame. Thus in this construction while being positively attached to the vehicle frame 84 the limb portions 82 are, compared to the construction shown in FIG. 7, relatively free to rotate relative to the frame.

Figure 12A:
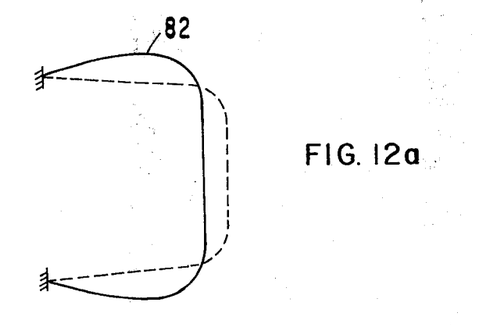
FIGS. 12a, b and c show diagrammatically the mode of deflection of the bumper shown in FIG. 11.
Figure 12B:
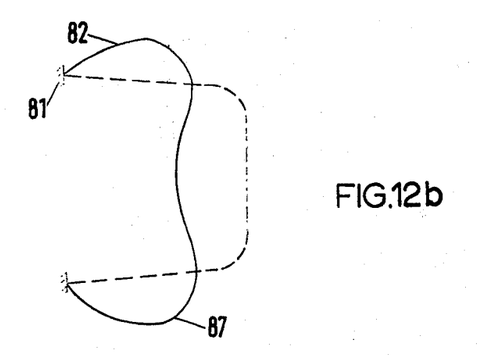

On impact initial deflection of the bumper is by buckling of the limb portions 82 as shown in FIG. 12a and is substantially similar to the initial deflection movement of the bumper described in respect of the preceding embodiment of the invention, a high load being achieved at a small deflection. Further deflection occurs by additional buckling of the limb portions together with rotation of the limb portions about the secured ends and inward bending of the center section, and the initially curved moulded corners 87 straighten as shown in FIG. 12b and absorb further energy. This deflection occurs under substantially constant load levels substantially as described in respect of the preceding embodiment.

Figure 12C:
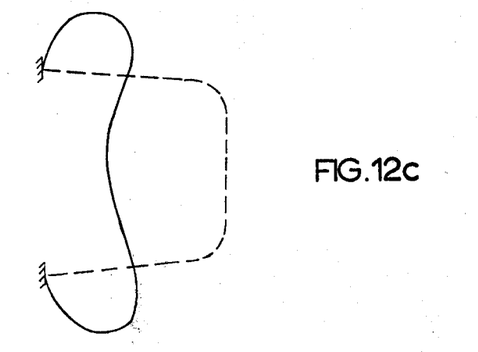

Subsequent deflection causes the sides to bottom as shown in FIG. 12c and the load level then increases significantly substantially in the manner described in respect of the preceding embodiment.

As compared with the bumper arrangement of the preceding embodiment, the mode of deflection of the bumper arrangement of the present embodiment is substantially similar but initial deflection occurs at a lower load level and the maximum deflection is increased by allowing the edges of the limb portions to rotate.

Figure 13:
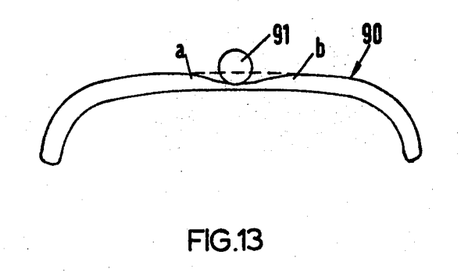
FIG. 13 shows a plan view of an impacted bumper.

Deflection of bumpers as hereinbefore described when impacted locally causes deformation of the bumper for a substantial distance either side of the impacted section as shown in FIG. 13. A bumper 90 is shown impacted against a pole 91 and it can be seen that portion of the bumper between points marked a and b deforms to absorb energy. There is therefore provided a good resistance to deformation since a not insignificant length of the bumper serves to absorb impact energy.

While in preceding embodiments of the invention bumpers have been described which have plastics outer layers they may alternatively be formed with rubber outer layers. The laminated material may comprise two, three or more layers of material, the number and thickness of the layers being selected to provide the required energy absorption capabilities.

While the use of ethylene propylene diene monomer and low density polyethylene as the rubber-plastics composite material has been described in respect of the first embodiment, this combination of materials is suitable for use in the other described embodiment, or any suitable combination of materials referred to earlier in the specifications may be used for constructing any of the described embodiments.

The manufacturing method, or subsequent deformation on assembly of the bumper may be such that the outer layer is in compression. This is particularly advantageous where the outer skin is of rubber since compressive stresses will suppress any tendency for the spreading of small cuts sustained by the rubber in an impact situation.

A bumper may be manufactured as a complete unit for fitting to a vehicle or it may be manufactured in sections, for example a straight central section and curved end sections, and the sections may be joined prior to or at the time of assembly to the vehicle.

Bumpers and bumper units may be formed by, for example, injection moulding, vacuum forming, or extrusion.

In the case of injection moulding, plastic may be injected round a previously moulded rubber section. Alternatively, rubber could be injected around a preformed plastic section, or a preformed laminate moulded to the desired shape.

Figure 14:
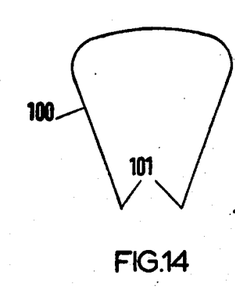
FIG. 14 shows diagrammatically in cross-section a bumper as moulded.
Figure 15:
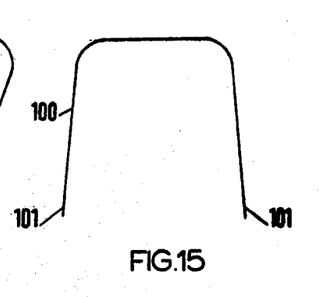
FIG. 15 shows the bumper of FIG. 14 deformed to compress the outer layer of the bumper.

Initial compression of an outer rubber layer of a bumper may be achieved as shown diagrammatically in FIG. 14 by moulding a bumper 100 with the ends 101 of the limb portions, in cross-section, being more closely spaced than when in situ on a vehicle frame as shown diagrammatically in FIG. 15.

The energy absorber may define a fluid cavity either by itself or when mounted in position on, for example, a vehicle frame and the fluid cavity may contain suitable fluid to provide additional damping to that provided by the rubber-plastics material.

By use of the rubber-plastics composites which form the deformable limbs or leg members of energy absorbers in accordance with the present invention it is possible to provide energy absorbers of simple construction such as bumpers or mounting, which are capable of absorbing more energy than it such limbs or leg members were formed only of rubber material. A further feature of the use of bonded rubber-plastics composites is that since some plastics have damping characteristics which are far less affected by temperatures extremes than most rubber materials, and since the layer of plastics will generally be arranged to absorb a greater proportion of impact energy than the layer of rubber, energy absorbers in accordance with the invention may be provided with energy-absorbing characteristics which are less effected by temperature changes than would be similar energy absorbers formed only of rubber.

Particularly when the energy absorber is in the form of a mounting having an apex region, the provision of rubber-plastics composite material at the apex region permits the mounting to be firmly secured to the support member. Attachment means such as a bolt or pin may be securely embedded in and project from the plastics material while the rubber may be united, for example, by fusion-bonding, friction welding, adhesives or the use of bonding agents to the plastics layer at least as securely as it may be bonded to a conventional metal backing member. There is thus obviated the need to provide a relatively expensive backing or other metallic member bonded to the rubber, and the rubber-plastics layers may be united with sufficient strength such that, where the mounting is used to mount a vehicle bumper to a vehicle, the mounting is capable of transmitting to the vehicle any jacking or towing forces which may be applied to the bumper.

Having now described my invention, what I claim is:

1. An energy absorber comprising in cross-section at least one limb of rubber-plastic composite material comprising a layer of rubber and an adjacent layer of plastics, said layers being united together and each extending substantially in the direction of the length of the limb, the layer of plastics material being capable of absorbing more energy than the layer of rubber during progressive deformation of the limb by bending or buckling when subjected to compressive forces acting substantially in a direction of the length of the limb, and the rubber, when deformed, being capable of storing sufficient energy substantially to restore the energy absorber to substantially its original shape and configuration.

2. An energy absorber according to claim 1 wherein the plastics layer is not greater than half the total thickness of the limb.

3. An energy absorber according to claim 1 wherein the layers have been united together by fusion-bonding.

4. An energy absorber according to claim 1 wherein the layers have been united together by friction welding.

5. An energy absorber according to claim 1 wherein the layers have been united together by bonding agents.

6. An energy absorber according to claim 1 wherein the layers have been united together by adhesives.

7. An energy absorber according to claim 1 wherein the composite material comprises two layers of plastics and a layer of rubber therebetween.

8. An energy absorber according to claim 1 wherein the limb is contoured along part at least of its length to provide a preferential region of bending or buckling.

9. An energy absorber according to claim 1 comprising in cross-section at least two limbs of composite material.

10. An energy absorber according to claim 9 wherein the limbs are disposed substantially symmetrically relative to a normal direction of loading of the energy absorber.

11. An energy absorber according to claim 9 wherein the limbs are shaped and disposed relative to each other such that when subjected to load applied substantially longitudinally of the limbs the limbs will first deform in a stable manner and then be caused to buckle or bend.

12. An energy absorber according to claim 11 wherein the limbs are arranged to deform first in a stable manner substantially only in compression.

13. An energy absorber according to claim 9 wherein the limbs are integral with each other at least one of their ends.

14. An energy absorber according to claim 9 wherein the limbs are spaced from each other at least one of their ends.

15. An energy absorber according to claim 14 wherein the limbs are maintained in spaced relationship by a linking portion of material integral with the material of the limbs.

16. An energy absorber according to claim 15 wherein the linking portion is formed of the plastics material of the limbs.

17. An energy absorber according to claim 14 wherein the limbs are maintained in spaced relationship by a cross-member of rigid material.

18. An energy absorber according to claim 9 wherein the limbs are in the form of leg members separate from one another along at least a greater part of their lengths.

19. An energy absorber according to claim 18 wherein axes in the direction of the lengths of two leg members are located in a single plane.

20. An energy absorber according to claim 18 wherein axes in the direction of the length of leg members are located in at least two planes angled relative to one another.

21. An energy absorber according to claim 18 wherein the two limbs move inwardly towards each other when caused to bend or buckle.

22. An energy absorber according to claim 18 wherein the two limbs separate away from one another when caused to bend or buckle.

23. An energy absorber according to claim 9 wherein the energy absorber is V-shaped when viewed in cross-section.

24. An energy absorber according to claim 9 comprising a hollow member having in cross-section two limbs of corrugated shape.

25. An energy absorber according to claim 9 in the form of an annular hollow member having, when viewed in cross-section, two deformable limbs of rubber-plastics composite material.

26. An energy absorber according to claim 25 wherein the limbs collapse in a concertina manner.

27. An energy absorber according to claim 9 in the form of a bumper.

28. An energy absorber according to claim 9 in the form of a vehicle bumper.

29. An energy absorber according to claim 28 comprising in cross-section two limbs inter-connected one end of their ends by a cross-member formed integrally therewith.

30. An energy absorber according to claim 29 wherein the limbs are securable to a support by their ends furthest from the cross-member.

31. An assembly comprising an energy absorber according to claim 30 secured to a support with said ends restrained from angular movement relative to the support.

32. An assembly comprising an energy absorber according to claim 30 secured to a support with said ends relatively free to rotate relative to the support.

33. An energy absorber according to claim 25 comprising a fluid cavity for damping fluid.

34. An energy absorber according to claim 1 wherein the plastics is shaped to provide means for securing the energy absorber to a support.

35. An energy absorber according to claim 34 wherein the plastics defines an aperture or hole for means for securing the energy absorber to a support.

36. An energy absorber according to claim 1 having an outer impacting layer of pre-compressed rubber.

37. An assembly comprising an energy absorber according to claim 1 and a substantially rigid bumper.

* * * * *